(12) United States Patent
Huang et al.

(10) Patent No.: US 10,914,620 B2
(45) Date of Patent: Feb. 9, 2021

(54) SYSTEM AND METHOD FOR AUTOMATIC RUNTIME POSITION SENSOR GAIN CALIBRATION IN A LINEAR MOTION SYSTEM

(71) Applicant: Rockwell Automation Technologies, Inc., Mayfield Heights, OH (US)

(72) Inventors: Yuhong Huang, Acton, MA (US); Brian M. Perreault, Stow, MA (US); Eric J. Wildi, Lexington, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 254 days.

(21) Appl. No.: 16/201,464

(22) Filed: Nov. 27, 2018

(65) Prior Publication Data
US 2020/0166389 A1   May 28, 2020

(51) Int. Cl.
*B65G 35/06* (2006.01)
*B65G 54/02* (2006.01)
*G01D 18/00* (2006.01)
*G01D 5/14* (2006.01)

(52) U.S. Cl.
CPC .......... *G01D 18/006* (2013.01); *G01D 5/145* (2013.01)

(58) Field of Classification Search
CPC ............ B65G 54/02; B65G 2203/0283; B65G 2203/043; B65G 35/06; B65G 43/10
See application file for complete search history.

(56) References Cited

U.S. PATENT DOCUMENTS

| 7,448,327 | B2 | 11/2008 | Thornton et al. |
| 8,863,669 | B2 | 10/2014 | Young et al. |
| 9,346,371 | B2 | 5/2016 | King et al. |
| 2008/0006172 | A1 | 1/2008 | Thornton |
| 2015/0360581 | A1 | 12/2015 | King et al. |
| 2019/0077608 | A1* | 3/2019 | Huang .................. B65G 54/02 |

* cited by examiner

*Primary Examiner* — Alesa Allgood
(74) *Attorney, Agent, or Firm* — Boyle Fredrickson, SC

(57) ABSTRACT

A system to automatically calibrate gains and/or offsets for each position feedback signal in order to reduce variations between position feedback signals for each sensor in a linear drive system is disclosed. As a mover travels along a track segment, the segment controller records the position feedback signal output from each position sensor corresponding to a magnet on the mover passing the position sensor. The segment controller determines peak values for each position feedback signal and compares the peak values against a target peak value. The segment controller then adjusts a gain value for each sensor by a ratio of the target peak value to a measured peak value. The segment controller periodically monitors the position feedback values generated by one mover as it travels along the track segment and automatically updates the sensor gains as previously described.

18 Claims, 9 Drawing Sheets

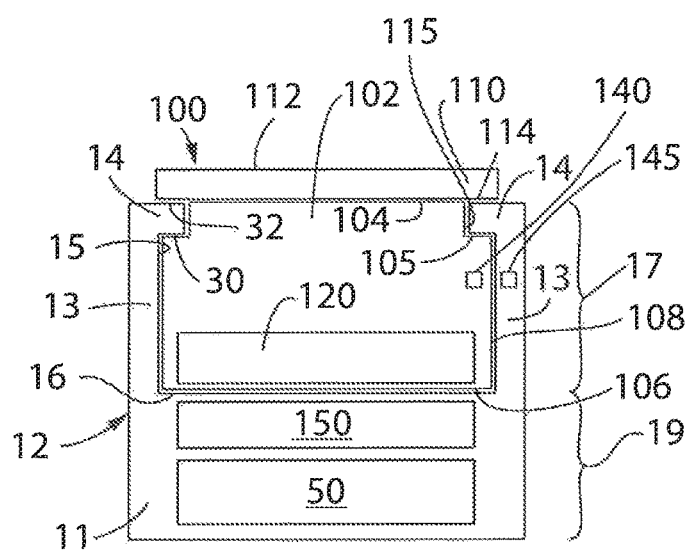
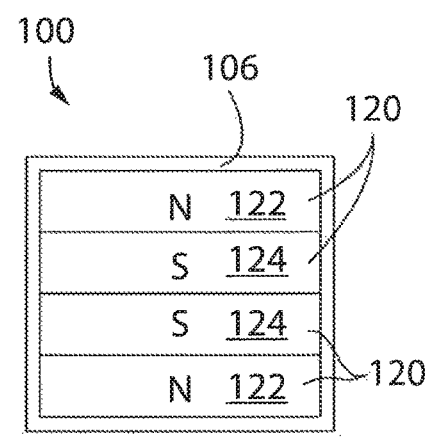
FIG. 2
FIG. 3
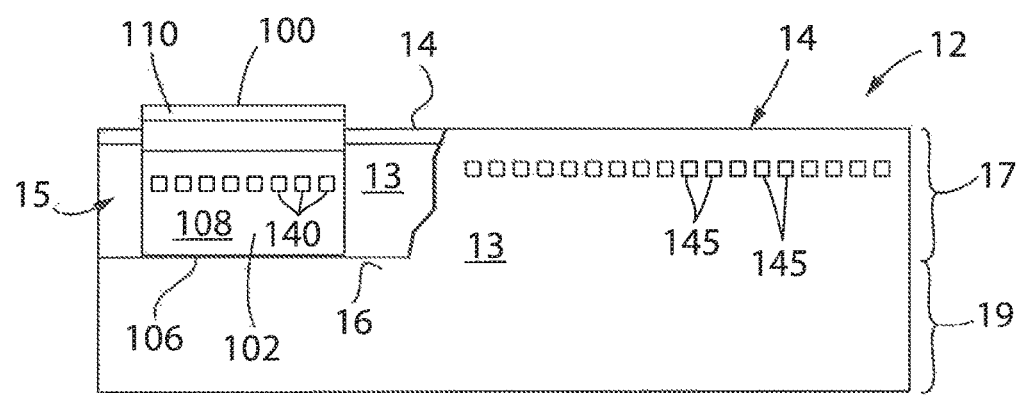
FIG. 4

SYSTEM AND METHOD FOR AUTOMATIC RUNTIME POSITION SENSOR GAIN CALIBRATION IN A LINEAR MOTION SYSTEM

BACKGROUND INFORMATION

The present invention relates to motion control systems and, more specifically, to automatically adjusting sensor gains for position sensors used to detect the position of movers in a linear drive system for a motion control system, where the motion control system incorporates multiple movers propelled along a track using the linear drive system.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

A controller for the linear drive system requires position information identifying the location of each of the movers in order to activate the appropriate coil and control motion of each mover according to a desired motion profile. One method to provide the position information of each mover to the controller is to place a position magnet on the mover and to provide a series of sensors spaced at fixed intervals along the track that detect the magnetic field generated by the position magnet. As a mover travels along the track, different sensors detect the magnetic field of the position magnet and generate a position feedback signal for the controller that is used to determine the location of each mover. This position feedback signal is an analog signal that varies in amplitude as a function of the relationship of the position magnet to the sensor. The controller uses the amplitude of the position feedback signal to determine a location of the mover with respect to the position sensor generating the feedback signal.

However, such a system for position sensing is not without certain drawbacks. The controller uses the amplitude of a position feedback signal or of two adjacent position feedback signals to determine the location of a mover. Variation in the amplitude of the position feedback signal will result in variation in the detected position. The controller expects a feedback signal having a nominal waveshape corresponding to a magnet passing the sensor. Based on the nominal waveshape, the controller is able to precisely determine the distance that the magnet is from the sensor and, therefore, determine the location of the mover along the track segment. It is known that position sensors, even of the same style or model, will have some variation between sensors. Variations in the amplitude of the position feedback signal may also be introduced due to manufacturing tolerances in the magnet (e.g., different field strengths), sensor (e.g., electronic component tolerances), or in assembly (e.g., positioning the magnet and sensor in different orientations or at different distances from each other). The resulting variations in amplitude of feedback signals generated by manufacturing and/or assembly tolerances cause the controller to determine a position for the mover that varies from the actual position of the mover as a function of these tolerances.

Because the controller utilizes position feedback information from different position sensors as the mover travels along the track, variations in the amplitude of the position feedback signal between adjacent sensors introduce some error in the position information for the corresponding mover. These variations may appear either as step changes in position between two adjacent position sensors or create some ripple on the position feedback signal as the mover travels along the track segment. Although the controller will compensate for these variations in the position feedback information, these step changes or the ripple on the position feedback signal similarly result in step changes and/or ripple on the current generated by the coils used to drive the movers in an attempt to compensate for the variations in position feedback information.

Thus, it would be desirable to provide a system to automatically calibrate gains and/or offsets for each position feedback signal in order to reduce variations between position feedback signals from each sensor.

BRIEF DESCRIPTION

The subject matter disclosed herein describes a system to automatically calibrate gains and/or offsets for each position feedback signal in order to reduce variations between position feedback signals for each sensor in a linear drive system. As a mover travels along a track segment, the segment controller records the position feedback signal output from each position sensor corresponding to a magnet on the mover passing the position sensor. The segment controller determines peak values for each position feedback signal and compares the peak values against a target peak value. The segment controller then adjusts a gain value for each sensor by a ratio of the target peak value to a measured peak value. The segment controller periodically monitors the position feedback values generated by one mover as it travels along the track segment and automatically updates the sensor gains as previously described.

According to another aspect of the invention, the segment controller may periodically monitor the values of each position feedback signal during an interval in which no mover is located proximate to a position sensor. During this interval, the position feedback signals should be zero. The segment controller may read the present value of each position feedback signal and automatically update the sensor offset value such that the feedback signals from each position sensor are zero when no magnet from a mover is within a detection range for the sensor.

According to one embodiment of the invention, a system for automatic sensor gain calibration in a linear drive system is disclosed. The system includes a track defining a path along which multiple movers travel and multiple position sensors spaced along the track. Each of the position sensors generates a feedback signal responsive to at least one of the movers traveling past the position sensor. The system also includes a memory device and a processor in communication with the memory device. The memory device is operative to store the feedback signal from each of the position sensors and to store a plurality of sensor gain values. Each sensor gain value corresponds to one of the position sensors. The processor receives the feedback signal from each of the position sensors and is operative to store the feedback signal from each of the position sensors in the memory device, determine a measured peak value of the feedback signal from each of the position sensors, generate a new sensor gain value for each of the position sensors as a function of a target peak value, of the measured peak value, and of the sensor gain value for each of the position sensors, and overwrite the sensor gain value stored in the memory device with the new sensor gain value for each of the position sensors.

According to another embodiment of the invention, a method for automatic sensor gain calibration in a linear drive system is disclosed. A feedback signal is received from each of multiple position sensors at a processor in a controller of the linear drive system. The position sensors are spaced along a track defining a path along which multiple movers in the linear drive system travel. The feedback signal is generated when one of the movers travels past each of the position sensors. A measured peak value of the feedback signal is determined from each of the positions sensors with the processor, and a new sensor gain value for each of the position sensors is generated as a function of a target peak value, of the measured peak value, and of an existing sensor gain value for each of the position sensors. The target peak value and the existing sensor gain value for each of the position sensors are stored in a memory device in the controller. The existing sensor gain value stored in the memory device is overwritten with the new sensor gain value determined for each of the position sensors.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 2 is a sectional view of one embodiment of a mover and track segment included in the linear drive system taken at 2-2 of FIG. 1;

FIG. 3 is a bottom plan view of the exemplary mover of FIG. 2;

FIG. 4 is a partial side cutaway view of the mover and track segment of FIG. 2;

Figure 1:
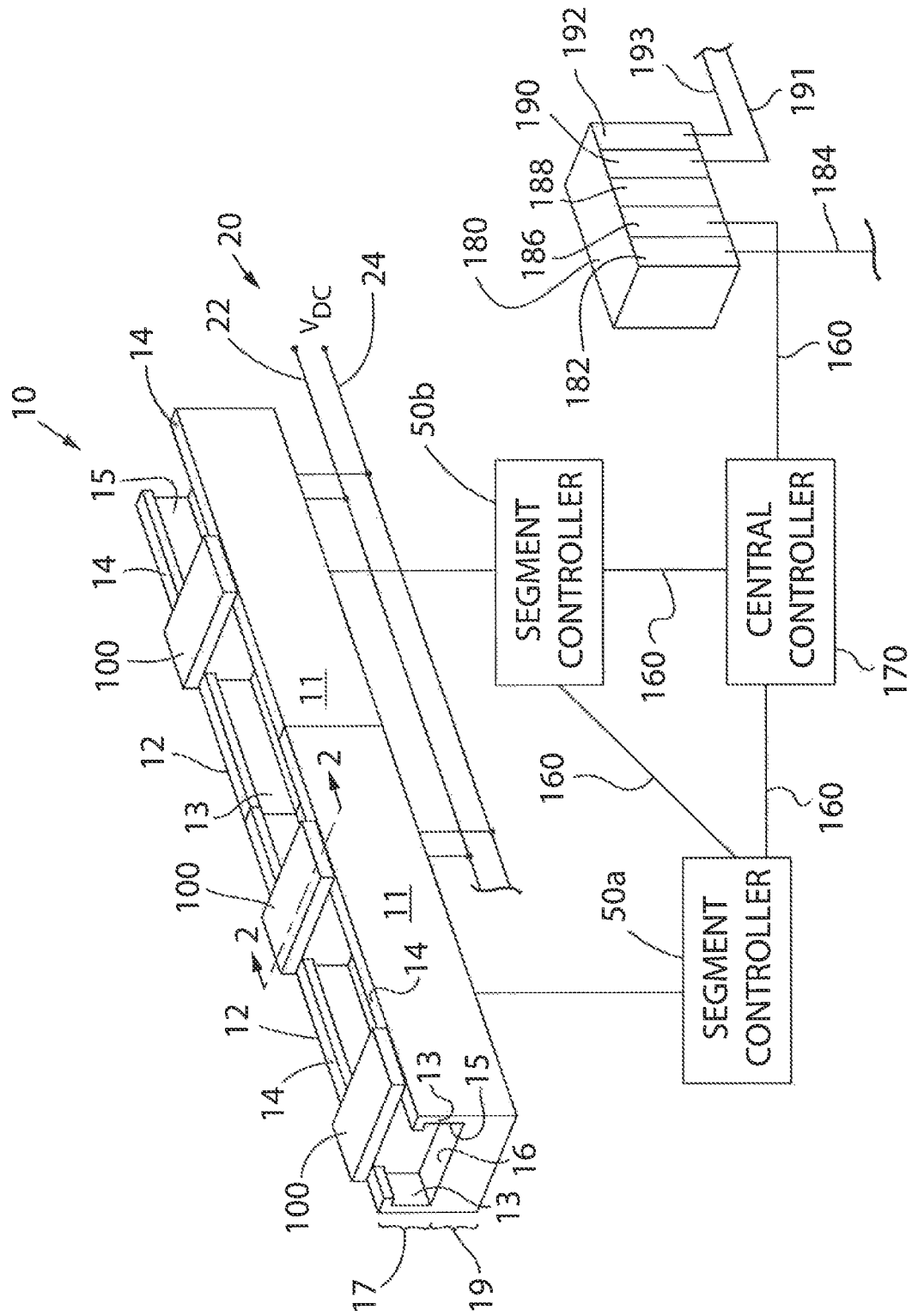
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIGS. 1-4, an exemplary transport system for moving articles or products includes a track 10 made up of multiple segments 12. According to the illustrated. embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. Track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing 11 of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track, it is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
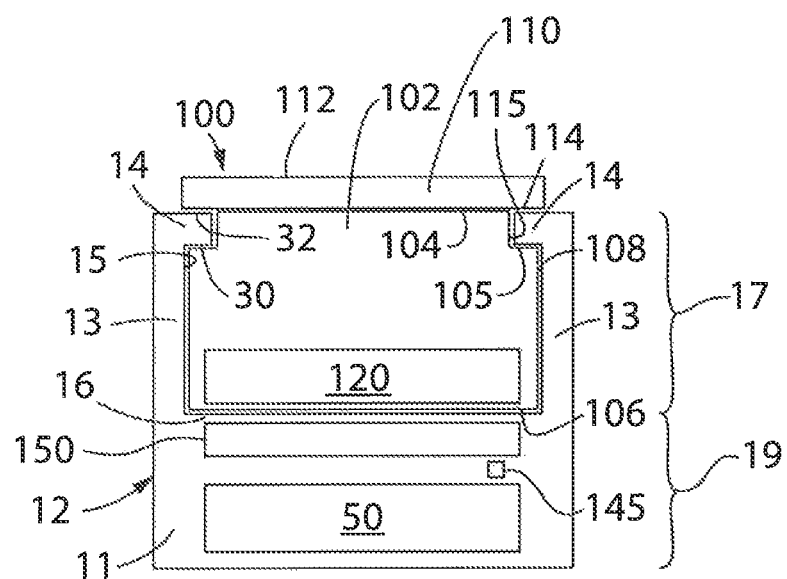
FIG. 5 is a sectional view of another embodiment of a mover and track segment included in the linear drive system taken at 2-2 of FIG. 1.
Figure 7:
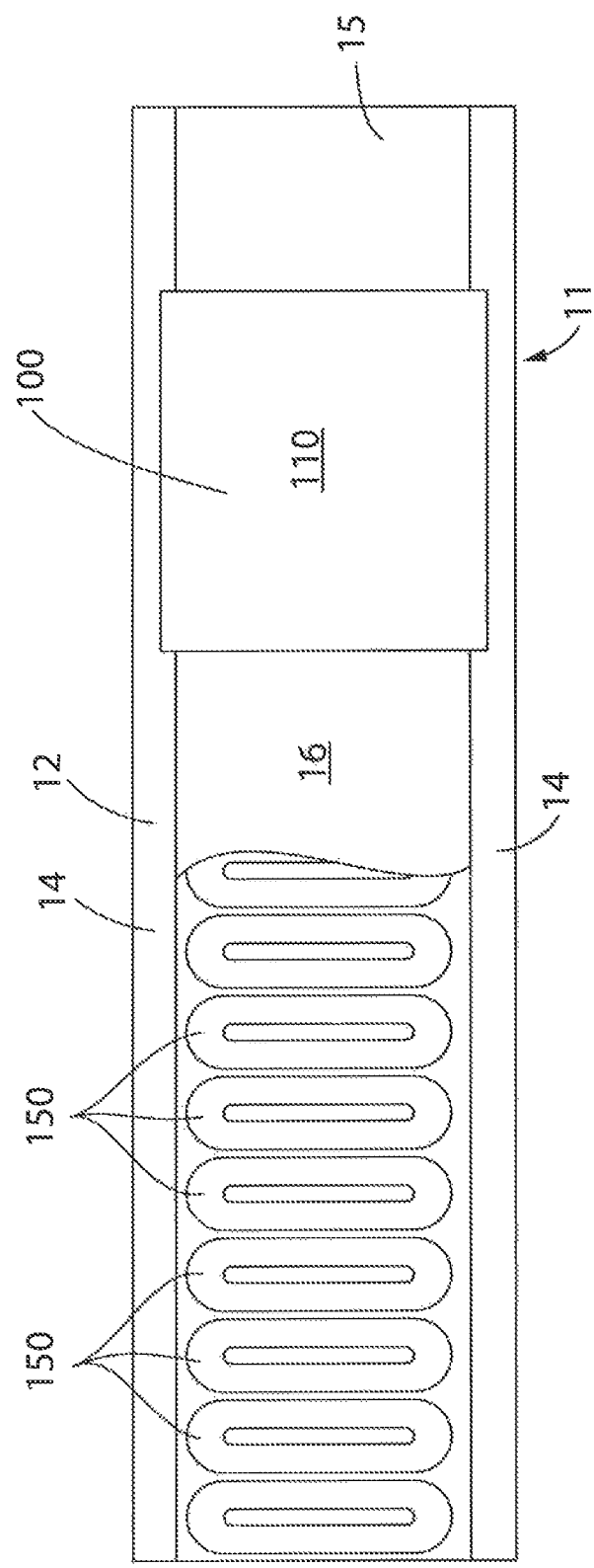
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
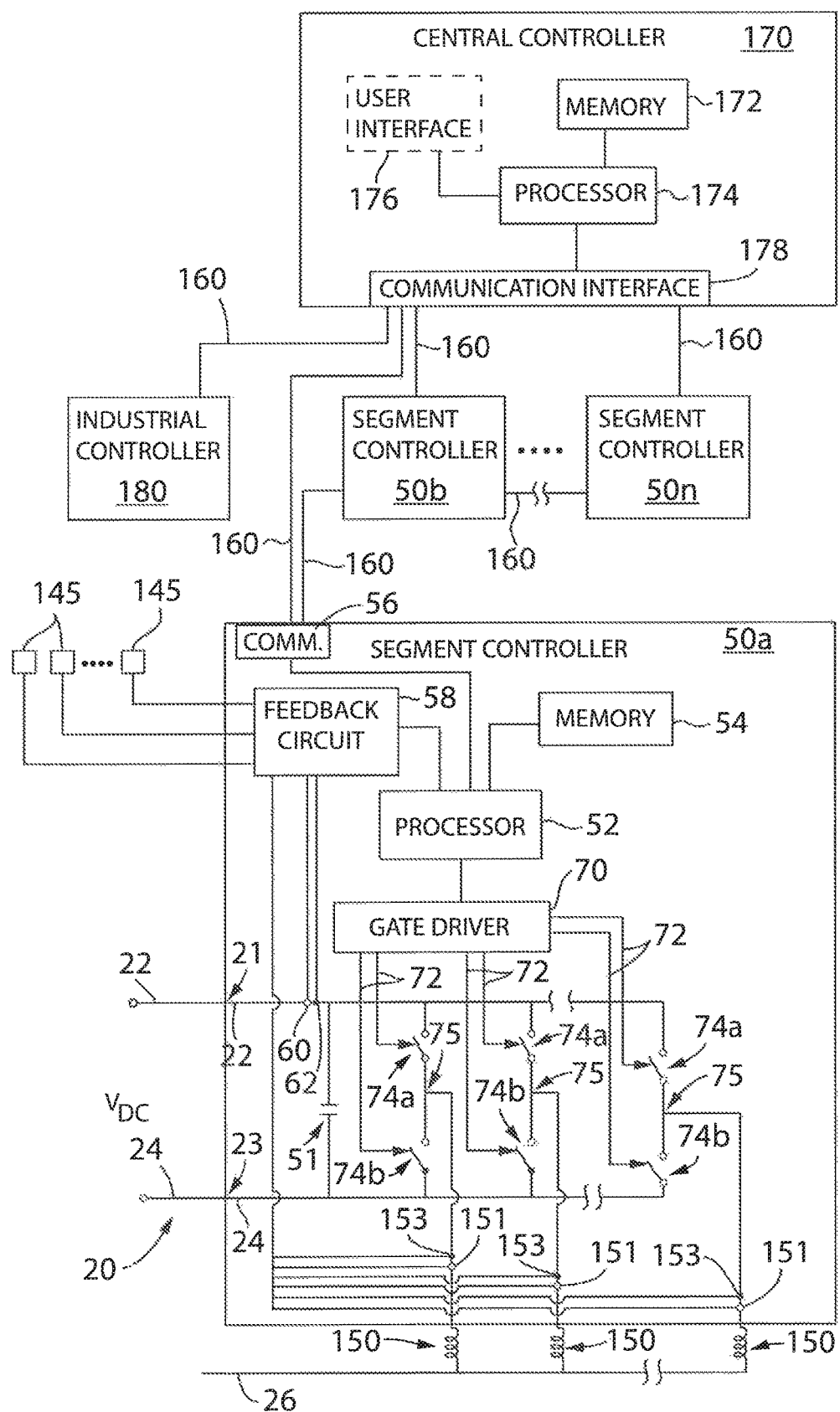
FIG. 8 is a block diagram representation of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided tier an operator to configure the central controller 170 and to load or configure desired motion profiles for the movers 100 on the central controller 170. Optionally, the configuration may be performed via a remote device connected via a network and a communication interface 178 to the central controller 170. It is contemplated that the system controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the system controller 170 and user interface may be an industrial computer mounted within a control cabinet and configured to withstand harsh operating environments. It is contemplated that still other combinations of computing devices and peripherals as would be understood in the art may be utilized or incorporated into the system controller 170 and user interface 176 without deviating from the scope of the invention.

The central controller 170 includes one or more programs stored in the memory device 172 for execution by the processor 174. The system controller 170 receives a desired position from the industrial controller 180 and determines one or more motion profiles for the movers 100 to follow along the track 10. A program executing on the processor 174 is in communication with each segment controller 50 on each track segment via a network medium 160. The system controller 170 may transfer a desired motion profile to each segment controller 50. Optionally, the system controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
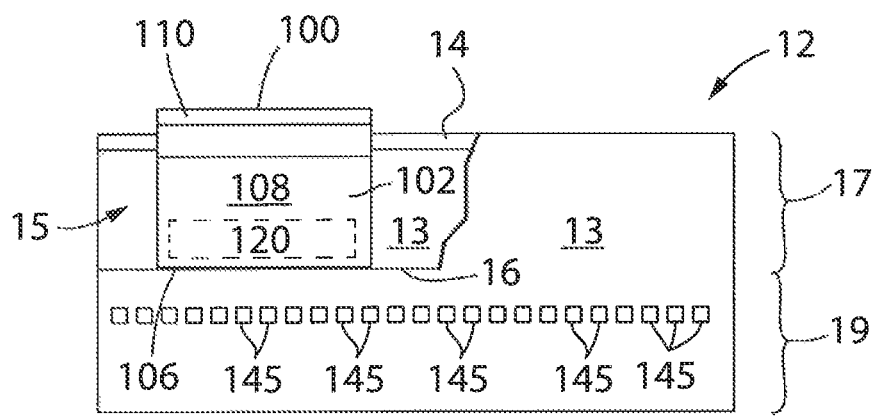
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, $V_{DC}$, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching device 74*a* and a second switching device 74*b* connected in series between the positive rail 22 and the negative rail 24 with a common connection 75 between the first and second switching devices 74*a*, 74*b*. The first switching device 74*a* in each leg 221 may also be referred to herein as an upper switch, and the second switching device 74*b* in each leg 221 may also be referred to herein as a lower switch. The terms upper and lower are relational only with respect to the schematic representation and are not intended to denote any particular physical relationship between the first and second switching devices 74*a*, 74*b*. The switching devices 74 include, for example, power semiconductor devices such as transistors, thyristors, and silicon controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Figure 9:
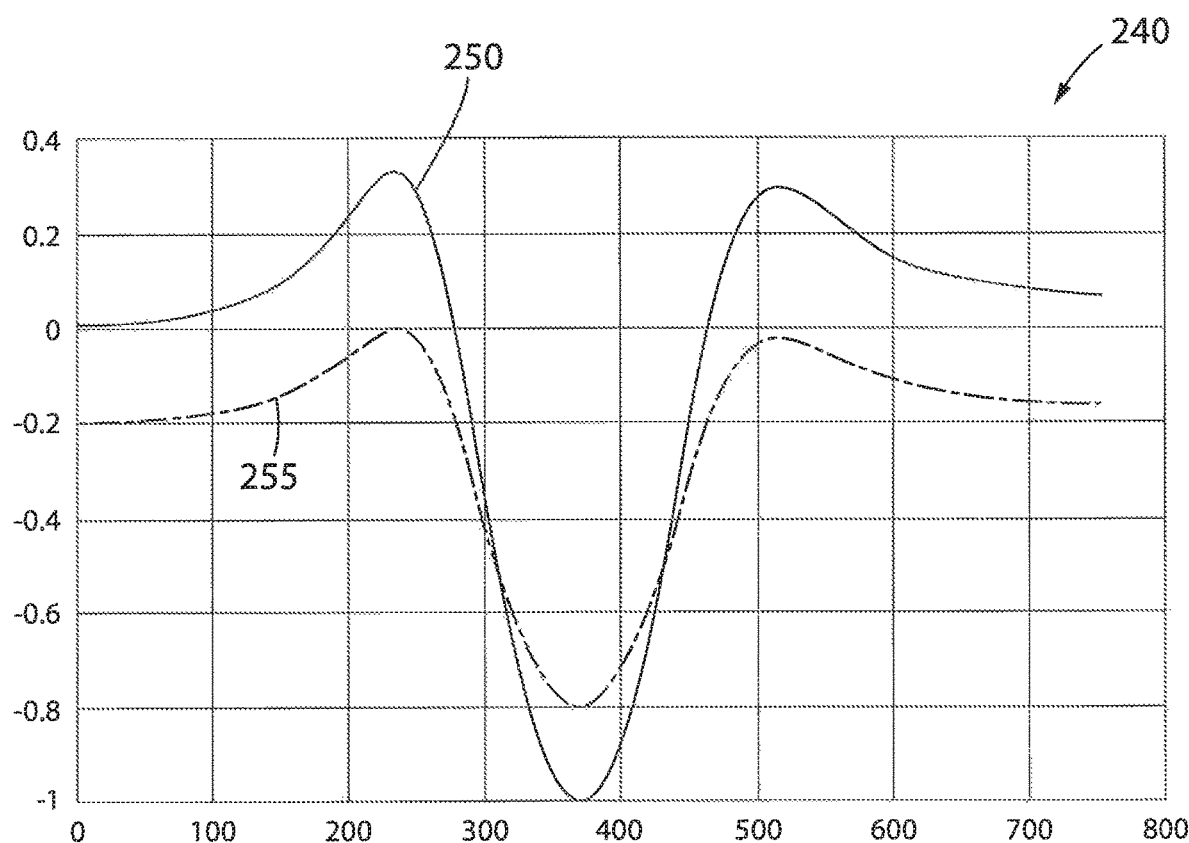
FIG. 9 is a graphical representation of a nominal position feedback signal compared to a non-ideal position feedback signal.

As previously discussed, the position feedback system provides knowledge of the location of each mover 100 along the length of the track segment 12 to the corresponding segment controller 50. A magnetic field detector, such as a Hall-Effect sensor, generates a waveform that varies with respect to the position of the mover 100 in relation to the sensor 145 responsive to the position magnet 140 passing the sensor 145. A nominal position feedback signal 250 generated by a sensor 145 as the position magnet 140 passes is illustrated in FIG. 9. The nominal position feedback signal 250 corresponds to an ideal feedback signal generated by one of the position sensors 145 if the position magnet 140 and position sensor 145 are each manufactured and installed according to their respective nominal configuration and without variations in manufacturing tolerances. The peak values of the nominal position feedback signal 250 correspond to a target peak value, the offset of the nominal position feedback signal is zero, such that the value of the nominal position feedback signal is at zero volts when no position magnet 140 from a mover 100 is within range of the sensor.

FIG. 9 also illustrates a second position feedback signal, where the second illustrated signal is a non-ideal position feedback signal 255 for comparison to the nominal position feedback signal 250. As the illustrated non-ideal position feedback signal 255 is compared to the nominal position feedback signal 250, there are clear differences between the signals. For example, at the zero position along the horizontal axis, corresponding to time at which the position feedback signal is being generated with no position magnet proximate to the position sensor 145, the nominal position feedback signal 250 is equal to zero. However, the non-ideal position feedback signal 255 is equal to a negative two-tenths, indicating an offset error in the non-ideal position feedback signal 255. Further, the difference between the maximum and minimum values of the nominal position feedback signal 250 is approximately one and three-tenths. However, the difference between the maximum and minimum values of the non-ideal position feedback signal 255 is approximately eight-tenths, indicating a gain error in the non-ideal position feedback signal 255, The variations in the feedback signals may be a result of manufacturing tolerances in the devices (e.g., the position magnet 140 or the sensor 145), in assembly of the position magnet 140 on the mover 100, in assembly of the position sensor 145 on the track segment 12, in the quality of the material covering the position sensor and located between the sensor and the magnet, or a combination thereof. Variations in the feedback signals, however, can create variations in the determination of a position for a mover 100 traveling along the track segment.

Figure 10:
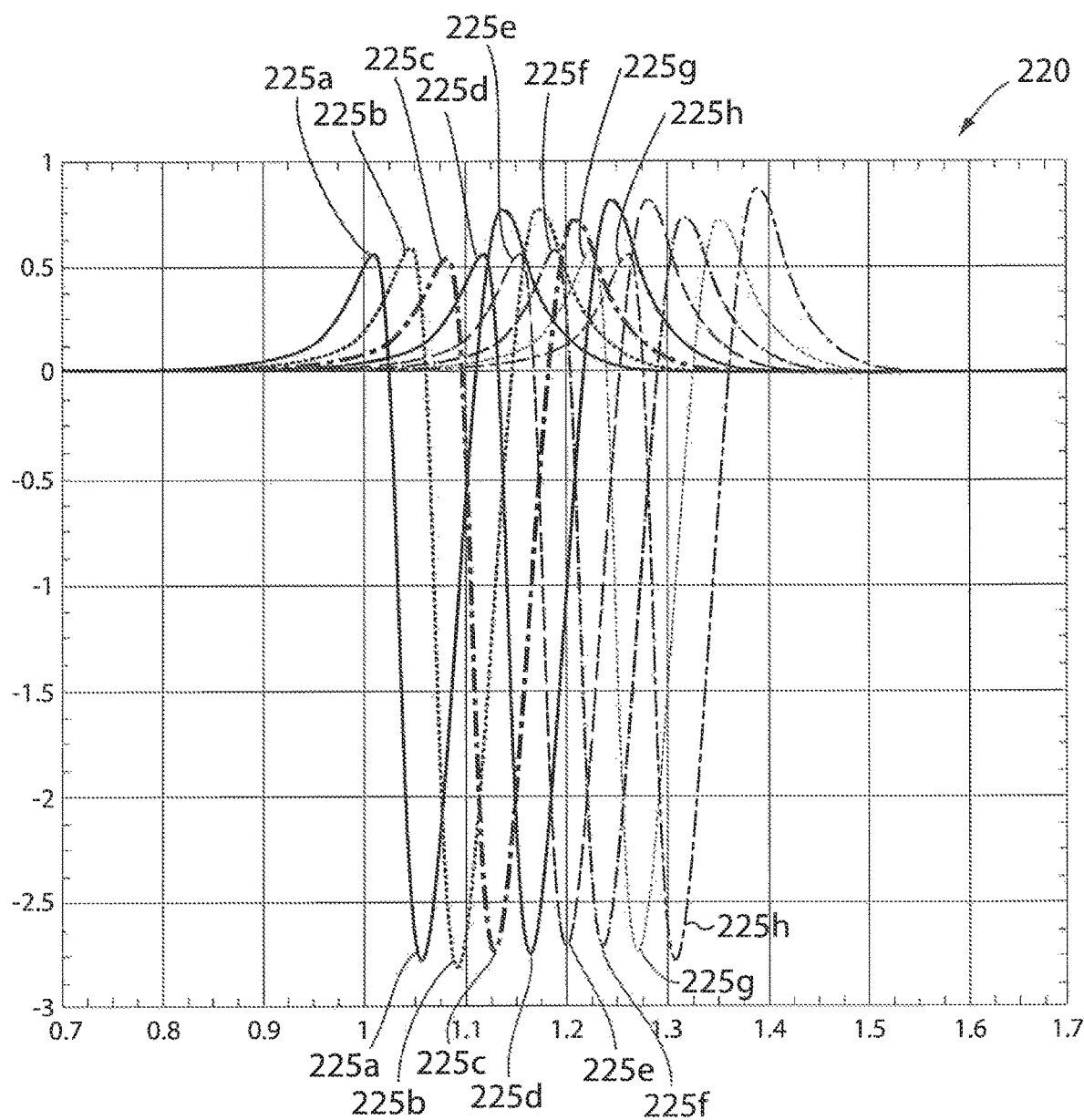
FIG. 10 is a graphical representation of multiple position sensor feedback signals without calibration.

With reference next to FIG. 10, multiple position feedback signals 225 are illustrated on a single graph 220. Each position feedback signal 225a-225h corresponds to a position magnet 140 passing a position sensor 145. The graph 220 is representative of two different scenarios. The graph 220 first may represent a single position magnet 140 passing multiple position sensors 145. In this scenario, each position feedback signal 225a-225h corresponds to a different position sensor 145. Alternately, the graph 220 may represent multiple position magnets 140 passing a single position sensor 145. in this scenario, each position feedback signal 225a-225h corresponds to a different position magnet 140. The segment controller 50 utilizes one or more of the position feedback signals 225 in real-time to determine position information for each mover 100 traveling along a track segment.

As a mover 100 travels along a track segment 12, the position feedback signals 225 may be stored in memory 54 on the segment controller 50 for further processing. As will be discussed in more detail below, the stored position feedback signals 225 may be used, for example, to determine gains and/or offsets for each sensor in order to provide more uniform feedback signals between different sensors. As a mover 100 travels along a track segment 12, the segment controller 50 is configured to store position feedback signals 225 from each position sensor 145 located along the track segment 12. If a mover 100 has a single position magnet 140, a single set of feedback signals 225 for the magnet 140 is stored for each position sensor 145. If a mover 100 includes an array of magnets 140, then a separate feedback signal 225 may be stored for each position magnet 140 as it passes each sensor 145. In other words, if a mover 100 includes four position magnets 140 and a track segment 12 includes eight sensors 145 spaced along its length, then thirty-two feedback signals 225 will be stored in the memory 54 for each mover 100 as it passes along the track segment 12. According to one embodiment of the invention, the memory 54 may include a table with memory allocated for each mover 100 and each position magnet 140 located on the mover 100. According to another embodiment of the invention, the memory 54 may include a table with memory allocated for a single mover 100. The processor 52 may be configured to store an identifier of each mover as it travels along the track segment 12 and associate the identifier with the set of feedback signals 225. Thus, further evaluation of the feedback signals 225 may identify a particular mover 100 with which a particular set of feedback signals 225 may be associated.

In order to account for variations in the feedback signals, it is contemplated that a compensation table may be stored in the memory 54 of the segment controller 50. Initially, the nominal position feedback signal 250 may be utilized to generate the compensation table for each of the position sensors 145 on the track segment 12. A position feedback signal 225 from each sensor 145 may be compared to the nominal feedback signal 250 which determines variations in the gain and/or offset present on a particular feedback sensor 145. During a commissioning process, a mover 100 having a position magnet 140 generating a known magnetic field may be driven past each of the position feedback sensors 145 on the track segment 12. Each of the position feedback signals 225 generated as the known position magnet 140 passes one of the position feedback sensors 145 is compared to the nominal position feedback signal 250. A difference between the values at the zero location, when the magnet 140 on the mover 100 is not close enough to the sensor 145 to generate a position feedback signal 225, may be stored in the compensation table for each sensor 145 to provide an initial offset compensation for each position feedback sensor 145. A difference between the maximum and minimum values may be stored in the compensation table for each sensor 145 or, optionally, the processor 52 may use the difference to determine an initial sensor gain for each sensor 145 and the initial difference or the initial sensor gain may be stored in the compensation table to provide gain compensation.

After the commissioning run and during normal operation, the processor 52 uses the offset and gain compensation values to normalize a position feedback signal prior to using the position feedback signal to determine the present location of each mover 100. The processor 52 may add the offset compensation value to a feedback signal 225 or multiply a feedback signal 225 by the gain compensation value corresponding to each sensor 145 to generate the compensated feedback signal for each position sensor 145 that is initially normalized to the nominal feedback signal 250. Even if an initial set of sensor gains and/or sensor offsets are stored in a compensation table, these values may change over time or during operation due, for example, to normal wear of the linear drive system or due to variations in operating conditions such as temperature, electromagnetic interference, and the like. Thus, the present invention automatically compensates sensor gain and/or offset information during operation of the linear drive system.

In operation, a controller in the linear drive system periodically monitors the position feedback signals 225 and automatically determines new sensor gain and/or offset information as the movers 100 are traveling along the track 10. According to one embodiment, the segment controller 50 is the controller used to automatically adapt the sensor gains and/or offsets. Optionally, the stored position feedback signals 225 may be periodically transmitted to the central controller 170 or the industrial controller 180 where the sensor gains and/or offsets maybe periodically adjusted. For ease of discussion, the embodiment of the invention with the segment controller 50 performing the adjustments will be discussed.

The segment controller 50 creates a record of each of the position feedback signals 225. As illustrated by the nominal position feedback signal 250 in FIG. 9, the cycle begins at the zero position, increases slightly to a first peak value, drops to a minimum value, increases again to a second peak value, and returns to the zero position. The illustrated waveform is exemplary only and may vary according to the type and/or the polarity of the magnetic field sensor used to detect the position magnet 140, According to a first embodiment, the segment controller 50 records each position feedback signal during an entire cycle of the position magnet 140 passing by the position sensor 145. Optionally, the processor 52 or a separate logic circuit may be configured to provide peak detection and the processor 52 may record just the peak values of each position feedback signal 225.

In either embodiment, the processor 52 uses the peak value, or values, of the position feedback signal 225 to determine a new sensor gain value for each of the position feedback signals. It is contemplated that the processor 52 may select one of the peak values, such as the minimum value as illustrated in FIG. 9, which has the greatest amplitude. Optionally, the processor 52 may determine a difference between the maximum and minimum values of the feedback signal and determine a peak-to-peak value of the position feedback signal 225. According to either embodiment, the peak or peak-to-peak value becomes a measured peak value. Using the target peak value, the measured peak value, and the existing sensor gain value, the processor 52 determines a new sensor gain value as shown below in Eq. 1. After determining the new sensor gain value, the processor 52 stores the new sensor gain value in the memory device 54.

$$K_{new} = \frac{Peak_{target} \cdot K_{existing}}{Peak_{measured}} \quad (1)$$

According to another aspect of the invention, it is contemplated that the processor 52 may utilize an average of measured peak values rather than a single measured peak value to determine new sensor gain values. The processor 52 may, for example, store one or more prior values of the measured peak value for each position feedback signal. The prior value or values may be averaged together with the new measured peak value for each position feedback signal. The average peak value of the position feedback signal may replace the measured peak value in Eq. 1 above.

While the process described above may be used generally to determine a new sensor gain for each of the position sensors 145, the processor 52 may be configured to execute the steps only in response to certain events or at certain times to avoid excessive processing steps being required. According to one aspect of the invention, the sensor gain values may be determined initially each time the power is cycled. The initial set of sensor gain values stored in the compensation table may be read from the memory device and written to a working set of sensor gain values, such that the initial set of sensor gain values remain for reference and are not overwritten. As each new sensor gain value is determined, it is written to the location in the set of working sensor gain values corresponding to the position sensor 145 for which it is determined. At power-up, the processor 52 may use each of the position feedback signals 225 generated by the first mover to travel along the track 10 in order to generate an initial set of adjusted sensor gain values. Optionally, each of the movers 100 may include an identifier, where the processor 52 maintains an association of each identifier, the corresponding mover, and its location along the track 10. One of the movers 100 may be selected as a reference mover and the position feedback signals 225 generated when the reference mover travels along the track are used to generate new sensor gain values.

According to another aspect of the invention, it is contemplated that the processor 52 adjusts the sensor gain values for each position sensor 145 during operation of the linear drive system. Because variations in the position feedback signals 225 may occur over time, the segment controller 50 is configured to periodically capture a set of position feedback signals 225 for the position sensors 145 located along that track segment and determine new sensor gain values. Operating conditions, such as temperature or other electronic devices generating electromagnetic interference may impact the waveform of the position feedback signal 225. Consequently, it may be desirable to configure the segment controller 50 to determine new sensor gain values at a shorter periodic interval such as every few minutes or tens of minutes. Other conditions, such as normal wear of the equipment may also impact the waveform of the position feedback signal 225. Such wear occurs more slowly, however, and may require the segment controller 50 to determine new sensor gain values over a longer periodic interval such as once per day or once per week. According to still another option, the controlled system may include a calibration run, which may be initiated by the industrial controller 180, during which one or more of the movers 100 traverse the length of the track 10 and a new set of sensor gain values are determined. The frequency at which the sensor gain values are determined and automatically updated are dependent, therefore, on the application requirements.

As discussed above, ideal sensors would generate position feedback signals identical in shape to each other and having the same shape as the nominal position feedback signal 250 as a position magnet 140 passes the sensor. As illustrated in FIG. 10, it is contemplated that the position sensors 145 may be spaced apart along the length of the track segment 12 at intervals that correspond to one-quarter of the wavelength of the nominal position feedback signal 250. Spacing the position sensors 145 at intervals equal to one-quarter of the expected wavelength of the signal allows the processor 52 to utilize two adjacent signals in a quadrature manner to determine the position of the mover 100. The exact shape of the waveform is less relevant but rather the uniformity of feedback signals from adjacent position sensors has greater relevance for accurately determining the position of the mover.

Figure 11:
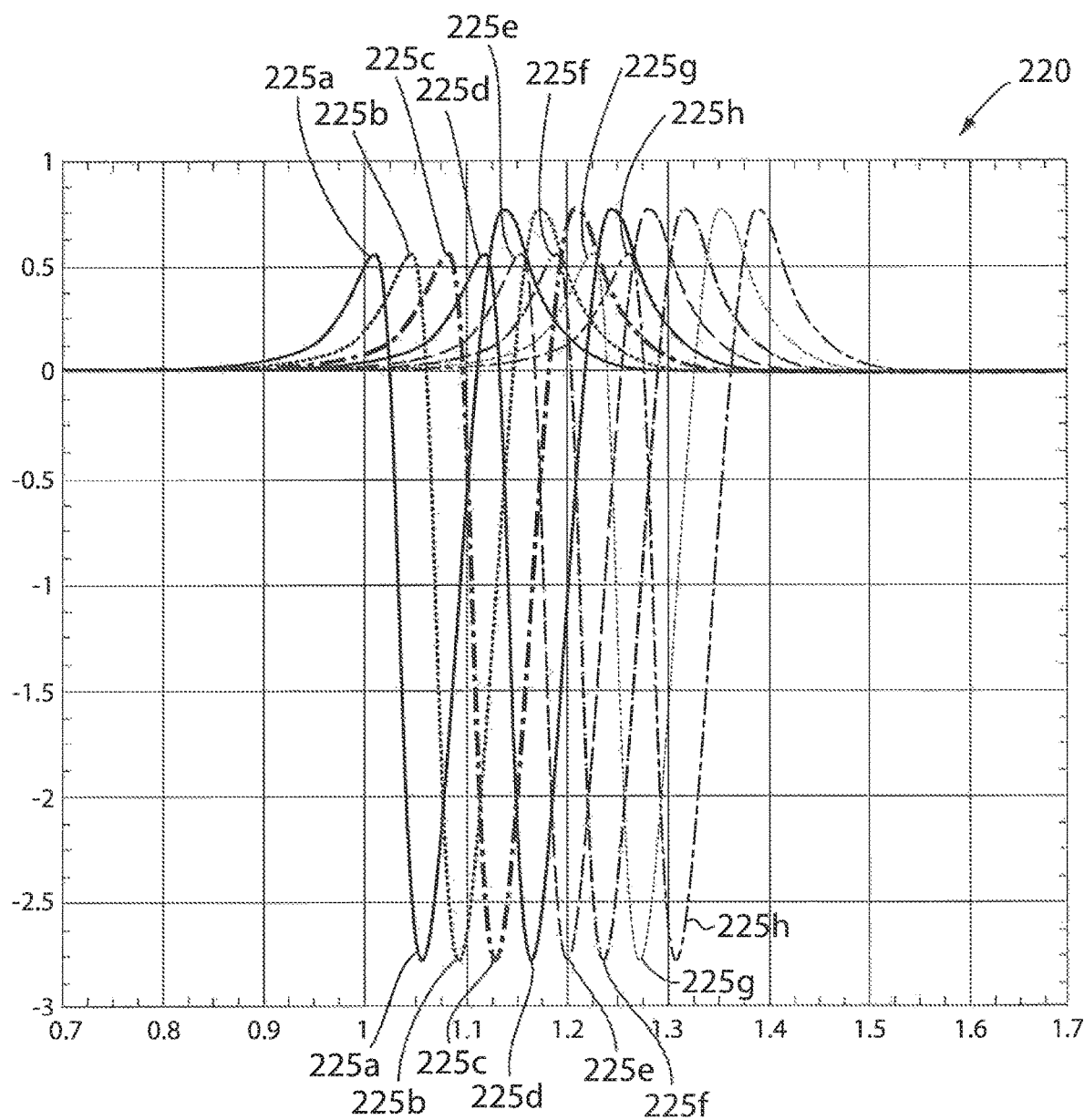
FIG. 11 is a graphical representation of multiple position sensor feedback signals with calibration performed according to one embodiment of the invention.
Figure 12:
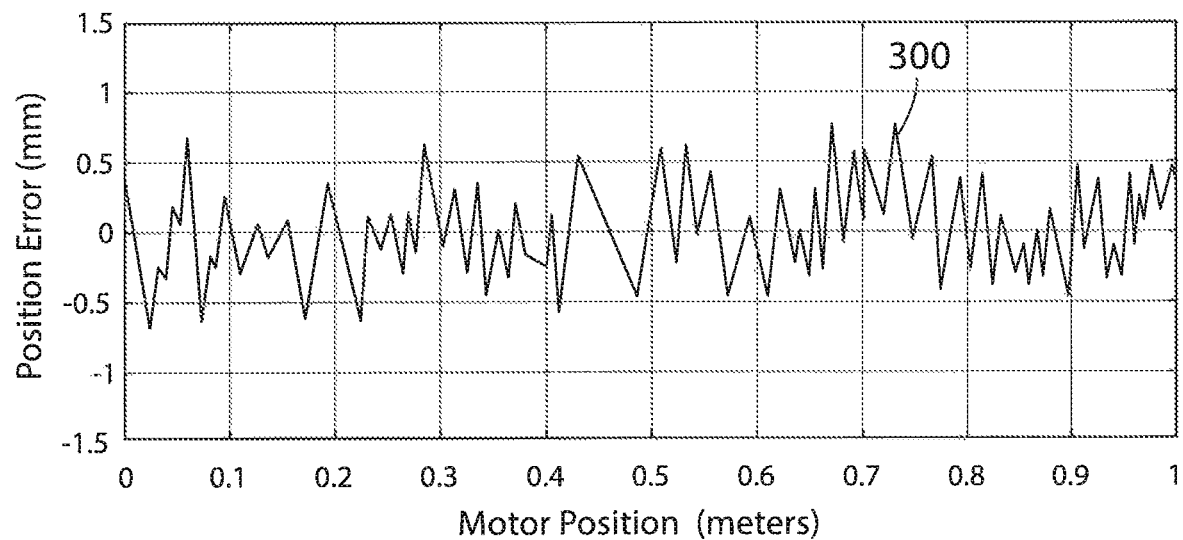
FIG. 12 is a graphical representation of position error for one mover along a segment of a track without calibration.
Figure 13:
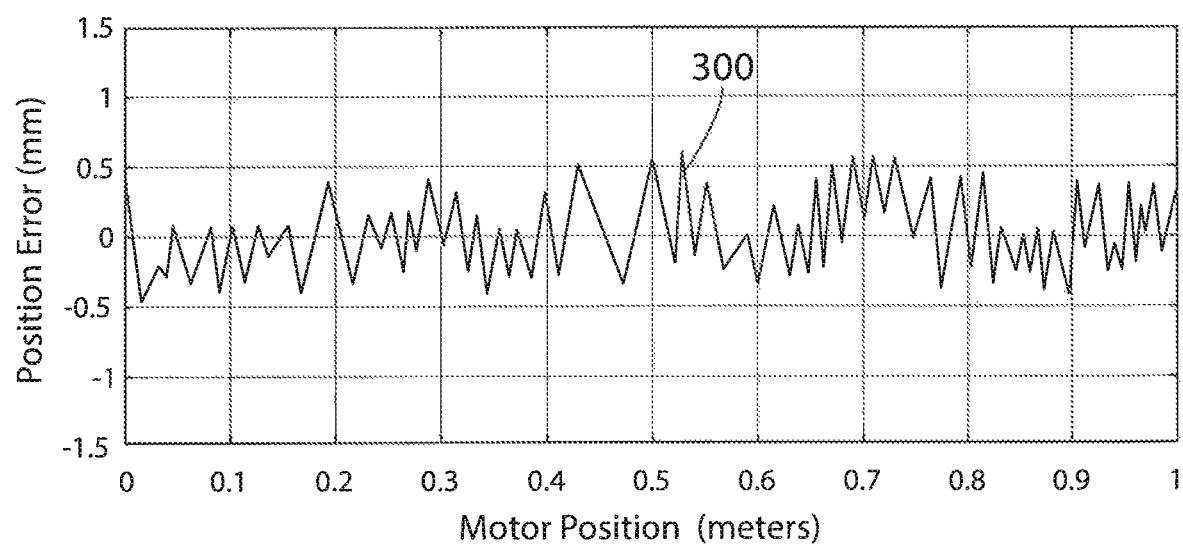
FIG. 13 is a graphical representation of position error for one mover along the segment of a track of FIG. 12 with calibration performed according to one embodiment of the invention.

As illustrated, however, in FIG. 10, the position feedback signals 225a-225h from different position sensors 145 will vary. The magnitude of a position error signal 300 is illustrated first in FIG. 12 utilizing position feedback signals where the sensor gain values are not compensated. FIG. 11 illustrates a second set of position feedback signals 225a-225h taken after the sensor gain values have been compensated. The waveforms illustrated in FIG. 11, demonstrate a greater uniformity than those waveforms illustrated in FIG. 10. The resulting magnitude of position error in the determination of the position for each mover 100 is reduced as illustrated by the second position error signal 300 shown in FIG. 13.

According to another aspect of the invention, it is contemplated that the segment controller 50 may similarly be configured to automatically adjust a sensor offset value for each of the position sensors 145. In contrast to determining the sensor gain value, the processor 52 is configured to periodically read the position feedback signal 225 when no position magnet 140 is within range of the position sensor 145, such that the position feedback signal 225 is within the zero position. The processor 52 stores the measured value of the position feedback signal 225 while in the zero position and determines a new offset value. According to one embodiment, the new offset value may be a difference between the measured value of the position feedback signal 225 and an expected value of the position feedback signal at the zero position. Optionally, the processor 52 may be configured to store multiple measured values of the position feedback signal and determine an average of the measured value. The new offset value is applied to the measured feedback signal to shift the signal to the expected level when no position magnet is present within the measurement range of the position sensor 145.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention, The embodiments described herein explain the best modes known for practicing the invention and will enable others skilled in the art to utilize the invention.

We claim:

1. A system for automatic sensor gain calibration in a linear drive system, the system comprising:
   a track defining a path along which a plurality of movers travel;
   a plurality of position sensors spaced along the track, wherein each of the plurality of position sensors generates a feedback signal responsive to at least one of the plurality of movers traveling past the position sensor;
   a memory device operative to store the feedback signal from each of the plurality of position sensors and to store a plurality of sensor gain values, wherein each sensor gain value corresponds to one of the plurality of position sensors; and
   a processor in communication with the memory device, wherein the processor receives the feedback signal from each of the plurality of position sensors and the processor is operative to:
   (a) store the feedback signal from each of the plurality of position sensors in the memory device,
   (b) determine a measured peak value of the feedback signal from each of the plurality of position sensors,
   (c) generate a new sensor gain value for each of the plurality of position sensors as a function of a target peak value, of the measured peak value, and of the sensor gain value for each of the plurality of position sensors, and
   (d) overwrite the sensor gain value stored in the memory device with the new sensor gain value for each of the plurality of position sensors.

2. The system of claim 1 wherein the track includes a plurality of track segments, each track segment including:
   a portion of the plurality of position sensors spaced along the track, and
   a segment controller, wherein the segment controller includes the memory device and the processor for the track segment and wherein the segment controller is operative to generate the new sensor gain values for each of the portion of the plurality of position sensors on the track segment.

3. The system of claim 1 wherein each of the plurality of movers includes at least one magnet and each of the plurality of position sensors is a Hall-effect sensor operative to detect the at least one magnet as each of the plurality of movers travels past the Hall-effect sensor.

4. The system of claim 1 wherein the new sensor gain is generated by multiplying the sensor gain value with a ratio of the target peak value to the measured peak value for each of the position sensors.

5. The system of claim 1 wherein:
   the processor is further operative to store the measured peak value in the memory device as a prior peak value,
   at least one prior peak value for each of the plurality position sensors is stored,
   determine an average peak value for each of the plurality of position sensors from the at least one prior peak value, and
   the new sensor gain is generated by multiplying the sensor gain value with a ratio of the target peak value to the average peak value for each of the position sensors.

6. The system of claim 1 wherein the memory device is further operative to store a plurality of sensor offset values, wherein each sensor offset value corresponds to one of the plurality of position sensors.

7. The system of claim 6 wherein the processor is further operative to:
   read the feedback signal from each of the plurality of position sensors when no mover is located by the position sensor,
   determine a new offset value for each of the plurality of position sensors as a function of the feedback signal read when no mover is located by the position sensor and a target offset value, and
   overwrite the sensor offset value with the new offset value for each of the plurality of position sensors.

8. The system of claim 1 wherein:
   a first mover is selected from the plurality of movers,
   the processor is further operative to monitor a present position of the first mover as the first mover travels along the track, and
   steps (a)-(d) of claim 1 are executed when each of the plurality of position sensors generates the feedback signal responsive to the first mover traveling past the position sensor.

9. The system of claim 8 wherein:
   the processor is further operative to store the feedback signal from at least one of the plurality of position sensors for each of the plurality of movers traveling past the at least one of the plurality of position sensors,
   the measured peak value of each feedback signal from the at least one of the plurality of position sensors is compared to identify the feedback signal having a largest value, and
   the first mover is selected as the mover corresponding to the feedback signal having the largest value.

10. A method for automatic sensor gain calibration in a linear drive system, the method comprising the steps of;
    (a) receiving a feedback signal from each of a plurality of position sensors at a processor in a controller of the linear drive system, wherein the plurality of position sensors are spaced along a track defining a path along which a plurality of movers in the linear drive system travel and wherein the feedback signal is generated when one of the plurality of movers travels past each of the plurality of position sensors;

(b) determining with the processor a measured peak value of the feedback signal from each of the plurality of positions sensors;

(c) generating with the processor a new sensor gain value for each of the plurality of position sensors as a function of a target peak value, of the measured peak value, and of an existing sensor gain value for each of the plurality of position sensors, wherein the target peak value and the existing sensor gain value for each of the plurality of position sensors are stored in a memory device in the controller; and (d) overwriting the existing sensor gain value stored in the memory device with the new sensor gain value for each of the plurality of position sensors.

11. The method of claim 10 wherein:

the track includes a plurality of track segments, each track segment includes a portion of the plurality of position sensors spaced along the track and a segment controller, the segment controller includes the memory device and the processor for the track segment, and the segment controller is operative to generate the new sensor gain values for each of the portion of the plurality of position sensors on the track segment.

12. The method of claim 10 wherein each of the plurality of movers includes at least one magnet and each of the plurality of position sensors is a Hall-effect sensor operative to detect the at least one magnet as each of the plurality of movers travels past the Hall-effect sensor.

13. The method of claim 10 wherein step (c) includes multiplying the existing sensor gain value with a ratio of the target peak value to the measured peak value from each of the plurality of position sensors.

14. The method of claim 10 further comprising the steps of:

storing the measured peak value in the memory device as a prior peak value, wherein at least one prior peak value for each of the plurality position sensors is stored; and determining an average peak value for each of the plurality of position sensors from the at least one prior peak value, wherein step (c) includes multiplying the existing sensor gain value with a ratio of the target peak value to the average peak value for each of the position sensors.

15. The method of claim 10 further comprising the step of storing a plurality of sensor offset values in the memory device, wherein each sensor offset value corresponds to one of the plurality of position sensors.

16. The method of claim 15 further comprising the steps of:

reading the feedback signal from each of the plurality of position sensors at the processor when no mover is located by the position sensor;

determining a new offset value for each of the plurality of position sensors as a function of the feedback signal read when no mover is located by the position sensor and a target offset value, and overwriting the sensor offset value with the new offset value for each of the plurality of position sensors.

17. The method of claim 10 further comprising the steps of:

selecting a first mover from the plurality of movers;

monitoring a present position of the first mover with the processor as the first mover travels along the track; and steps (a)-(d) are executed when each of the plurality of position sensors generates the feedback signal responsive to the first mover traveling past the position sensor.

18. The method of claim 17 further comprising the steps of:

storing the feedback signal from at least one of the plurality of position sensors for each of the plurality of movers traveling past the at least one of the plurality of position sensors; and identifying the feedback signal having a largest peak value, wherein the first mover is selected as the mover corresponding to the feedback signal having the largest peak value.

* * * * *